United States Patent [19]

Hamlin

[11] Patent Number: 4,623,467
[45] Date of Patent: Nov. 18, 1986

[54] WATER PURIFYING AND VENDING APPARATUS

[75] Inventor: Jerry J. Hamlin, Mesa, Ariz.

[73] Assignee: International Manufacturing and Water Vending Company, Mesa, Ariz.

[21] Appl. No.: 623,918

[22] Filed: Jun. 25, 1984

[51] Int. Cl.$^4$ .................. B01D 13/00; B01D 31/00
[52] U.S. Cl. ................... 210/652; 210/663; 210/748; 210/257.2; 210/433.2; 222/189
[58] Field of Search ................ 194/3, 9 T, 13; 210/321.1, 433.2, 652, 663, 748, 257.2; 222/189

[56] References Cited

U.S. PATENT DOCUMENTS

| | | | |
|---|---|---|---|
| 3,207,282 | 9/1965 | Norris | 194/13 |
| 3,375,913 | 4/1968 | Norris | 194/13 |
| 3,813,334 | 5/1974 | Bray | 210/321.1 |
| 3,856,676 | 12/1974 | Grimme et al. | 210/652 X |
| 3,870,033 | 3/1975 | Faylor et al. | 210/664 X |
| 4,400,270 | 8/1983 | Hillman | 210/748 X |

Primary Examiner—F. J. Bartuska
Attorney, Agent, or Firm—Harry M. Weiss & Associates

[57] ABSTRACT

A water purification system for purifying water from a conventional supply of tap water and dispensing a predetermined quantity of processed water into a user-supplied container in response to the deposit of a predetermined value of specie, coin, or token. The system includes a first purified water path and a second drinking water path. The first purified water path includes a reverse osmosis filter, a tank, and an afterfilter coupled between a prefilter and an ultraviolet disinfecting apparatus. The second path is substantially in parallel with the first path and includes a polishing filter. Manually operated switches can be used to select either drinking water of purified water and timing means are provided to insure that a predetermined quantity of water is supplied from the dispensing means into the user-supplied container. Valves are used to operate the first path for purified water, and the second path for a limited time followed by the first path for a longer time for better tasting drinking water. The system also includes a detector for sensing improperly processed water from the reverse osmosis filter and a diverter for sending improperly processed water to a sump. The ultraviolet disinfecting system or apparatus includes a hollow plastic housing with a lamp mounted therein. The lamp is wrapped in plastic and an annular space between the outer surface of the lamp and the inner surface of the housing provides a flow path for the purified water during which time disinfecting takes place prior to dispensing.

6 Claims, 16 Drawing Figures

| VEND SECONDS | SWITCH COMBINATIONS |||||||| 
| --- | --- | --- | --- | --- | --- | --- | --- | --- |
| | 1 | 2 | 3 | 4 | 5 | 6 | 7 | 8 |
| 30 |   | ▨ | ▨ | ▨ | ▨ |   |   |   |
| 31 | ▨ | ▨ | ▨ | ▨ | ▨ |   |   |   |
| 32 |   |   |   |   |   | ▨ |   |   |
| 33 | ▨ |   |   |   |   |   |   |   |
| 34 |   | ▨ |   |   |   | ▨ |   |   |
| 35 | ▨ |   |   |   |   |   |   |   |
| 36 |   |   |   | ▨ |   | ▨ |   |   |
| 37 | ▨ |   |   |   |   |   |   |   |
| 38 |   | ▨ | ▨ |   |   | ▨ |   |   |
| 39 | ▨ |   |   |   |   |   |   |   |
| 40 |   |   |   | ▨ |   | ▨ |   |   |
| 41 | ▨ |   |   |   |   |   |   |   |
| 42 |   | ▨ |   |   |   | ▨ |   |   |
| 43 | ▨ |   |   |   |   |   |   |   |
| 44 |   |   |   | ▨ | ▨ |   |   |   |
| 45 | ▨ |   |   |   |   |   |   |   |
| 46 |   | ▨ | ▨ | ▨ | ▨ |   |   |   |
| 47 | ▨ | ▨ | ▨ | ▨ | ▨ |   |   |   |
| 48 |   |   |   |   |   | ▨ |   |   |
| 49 | ▨ |   |   |   |   |   |   |   |
| 50 |   | ▨ |   |   |   | ▨ |   |   |
| 51 | ▨ |   |   |   |   |   |   |   |
| 52 |   |   |   | ▨ |   | ▨ |   |   |
| 53 | ▨ |   |   |   |   |   |   |   |
| 54 |   | ▨ | ▨ |   |   | ▨ |   |   |
| 55 | ▨ |   |   |   |   |   |   |   |
| 56 |   |   |   | ▨ |   | ▨ |   |   |
| 57 | ▨ |   |   |   |   |   |   |   |
| 58 |   | ▨ |   |   |   | ▨ |   |   |
| 59 | ▨ |   |   |   |   |   |   |   |
| 60 |   |   |   | ▨ | ▨ |   |   |   |

AVERAGE VEND TIME FOR DISPENSING ONE GALLON (seconds 38–44)

WATER PURIFYING AND VENDING APPARATUS

BACKGROUND OF THE INVENTION

1. Field of the Invention

The present invention relates to water purifying and vending apparatus, and more particularly to a method and apparatus for providing purified or drinking water which is of sufficient purity for drinking, cooking, automobile batteries, radiators, and the like.

2. Description of the Prior Art

Many types of vending machines are commercially available in the prior art and several different types of water vending machines have been available for at least twenty years. These systems generally involve a coin-operated liquid vending apparatus for the bulk vending of water or similar liquids. The systems generally purify water from a well, reservoir, municipal water system or similar source by removing certain minerals and other impurities therefrom.

The early prior art systems utilized ion-exchangers or distillation units for purifying purposes. Several systems provided means for dispensing several selected quantities of water to be dispensed depending upon the total value of coins deposited in the machine.

Other prior art systems dispense either demineralized water or drinking water of balanced mineral content. Since the flavor and taste of the water for drinking purposes depends on the public dictate, the presence of a certain mineral content in high grade drinking water is essential. Therefore, the prior art systems added a solution of minerals and blended the mineral mixture or solution into the purified or demineralized water during the vending cycle whenever drinking water was selected.

Some prior art systems utilize a timed flow of water at a constant pressure whereas others use a positive displacement electric contact flow meter to measure the amount of water dispensed. Prior art systems often employed means to render the delivery apparatus ineffective if the water to be dispensed does not satisfy a preselected purity standard. Other systems provide shelf levels to accomodate both one gallon and five gallon containers.

The use of a solution of minerals for addition to the purified or demineralized water for obtaining flavor in drinking water is complex and cumbersome. Distilled or demineralized water is substantially completely free from minerals whereas purified water may be more desirable for most applications.

There is no simple two path system for dispensing a selected one of both drinking water and purified water and no means for operating the different paths to produce the desired quantity of drinking water or purified water.

The still operation for demineralization is relatively expensive, unreliable in remote locations, and often leads to improperly purified water and system shutdown. Prior art systems do not always remove such contaminates as chlorine and the like from the water and micro-organisms are not substantially 100 percent killed since they are present in the solution of minerals for producing drinking water and the like.

The automatic shutdown system of the prior art in response to impure water terminates the operation of the system rather than permitting the system to draw from a reserve or storage tank until maintenance can arrive to repair the system. A need exists for a system which will supply a higher quality of drinking water from processed raw water and for supplying purified water by filtering means without the use of complex stills, dionization systems, demineralizers, or the like.

A need also exists for a method and apparatus for vending water in response to the deposit of coins, specie, token, and the like to dispense a predetermined quantity of water into a user-provided container wherein the user is given the opportunity of selecting either drinking water or purified water; wherein the deposit of the coin provides various vending cycle times for controlling the operation of the system and the quantity of water dispensed; and wherein micro-organisms and the like are substantially 100 percent killed before the purified water or drinking water is dispensed.

The present invention provides an improved water purification and vending system for solving substantially all of the problems of the prior art and providing many unique advantages thereover.

SUMMARY OF THE INVENTION

Accordingly, it is an object of the present invention to provide a water vending apparatus which will selectively vend purified as well as drinking water having a desired flavor.

Another object of the present invention is to provide a coin-operated water vending apparatus for connection to a local water supply containing undesirably high pollutants, contaminates, micro-organisms and the like and which will selectively vend a predetermined quantity of purified or drinking water without these undesirable materials in response to the deposition of a certain value of specie, coin, token, or the like.

It is still another object of the present invention to provide a vending apparatus having a storage tank for containing purified water to insure that water is available to be dispensed even if a part of the system is shutdown or disabled due to the current generation of impure water.

It is yet a further object of this invention to provide a coin-operated bulk vending apparatus for purified water incorporating first purified water path and a second drinking water path and for providing control means for controlling the time of operation of the purification process in each path for providing a selected one of drinking water or purified water with the drinking water being produced by supplying a predetermined amount of water from the second path to be mixed or combined with a predetermined quantity of water from the first purified water path.

It is still another object of the present invention to provide a water vending and purification system employing a unique disinfecting system including an ultraviolet means for killing substantially all micro-organisms in the purified water prior to the water being dispensed.

It is still a further object of this invention to provide timing means for controlling the vending cycle time of two paths in the purification system and control means for selectively opening and closing the paths to provide a desired mix of drinking water and purified water for dispensing a predetermined amount thereof.

It is still another object of the present invention to provide a unique water purity sensing system for monitoring the output of the reverse osmosis filter and diverting the flow of water to a sump or drain in response to the detection of impure of improperly processed water.

Lastly, another object of this invention is to provide a method and apparatus for purifying and vending water from a conventional source of tap water and dispensing a predetermined quantity of water in response to the deposit of a coin and the selection of either purified water or drinking water while providing safe, purified water and drinking water, with flavor, in a simple, low-cost, easy-to-maintain, relatively maintenance-free, system.

The present invention discloses a coin-operated vending apparatus for dispensing a predetermined quantity of purified liquid such as water into a container means upon each vending operation of the apparatus. Inlet means are provided for coupling the apparatus to a conventional source of liquid means responsive to the deposit to a predetermined value of at least one of specie, currency, token, and the like is provided for generating a vend signal. Means responsive to the vend signal dispense a predetermined quantity of purified liquid into the container and means operatively coupling the inlet to the dispensing means operate to purify the liquid.

The purifying means includes a first prefilter means for removing particulates larger than a predetermined size, for removing contaminates such as chlorine and the like which could harm the reverse osmosis apparatus, and for removing various organic compounds and the like. A reverse osmosis filter is coupled to the prefilter for removing substantially all remaining undesirable particulates and contaminates from the prefiltered source liquid. A storage tank is provided for temporarily containing the reverse osmosis filtered liquid and an afterfilter removes any remaining contaminates including chlorine, low-molecular weight organic compounds and the like prior to the water being dispensed. An ultraviolet purifying means is provided for killing substantially all micro-organisms in the purified water before passing the water to the dispensing means.

The method and apparatus of the present invention may also include a first purified water path including the reverse osmosis filter, the tank, and the afterfilter, and further including a second drinking water path including a polishing filter for removing contaminates including chlorine, for removing low molecular weight organic compounds, and the like from the water passing therethrough.

The system means also include means for determining which of a first and second class of liquid has been selected by a user such as purified water and drinking water and generating a first and second purification class selection signal indicative thereof. A first valve means in the first path is responsive to the first class signal processing purified water and the second path includes a second valve means responsive to said second purification class signal for processing a relatively small amount of drinking water for dispensing into the container to add flavor to subsequently added purified water.

Timing means may be provided for establishing the length of first, second and third predetermined time intervals so that the operation of the second drinking water path proceeds for said second time interval followed by the operation of said first path for said third time interval so that the combined time intervals are equal to the first time interval or to that time necessary to produce said predetermined quantity of liquid.

The method and apparatus also includes manually-operable means for establishing the time intervals, and the manually-operable means may include a plurality of switches for each binary position of a decimal number indicative of the time required to produce the desired quantity of liquid.

The system further includes means for detecting the quality or purity of water coming from the reverse osmosis filter and a 3-way valve means for forwarding good water to the tank and diverting reject water to the sump or drain.

The invention also contemplates that the ultraviolet disinfecting means includes a generally cylindrical housing having an elongated interior with a longitudinal axis therethrough. An ulraviolet lamp is provided between the two ends of the housing within the hollow interior and aligned with the axis. Means are provided for supplying operating power to the lamp and a heat-shrunk layer of thin plastic material is used to coat the lamp for preventing actual contact between the surface of the lamp and the water flowing therethrough. The outer diameter of the lamp is less than the inner diameter of the housing to provide an elongated annular space for the passage of water about the lamp to enable the emissions therefrom to kill substantially all micro-organisms contained in the water. An inlet and outlet are provided in the housing adjacent opposite ends thereof and approximately perpendicular to the axis for supplying and removing water from the interior via said annular space.

Other advantages and meritorious features of the present invention will be more fully understood from the following description of the drawings in the preferred embodiment, the appended claims and the drawings which are described hereinbelow:

DESCRIPTION OF THE PREFERRED EMBODIMENT

Figures 1, 2, 3, 5:
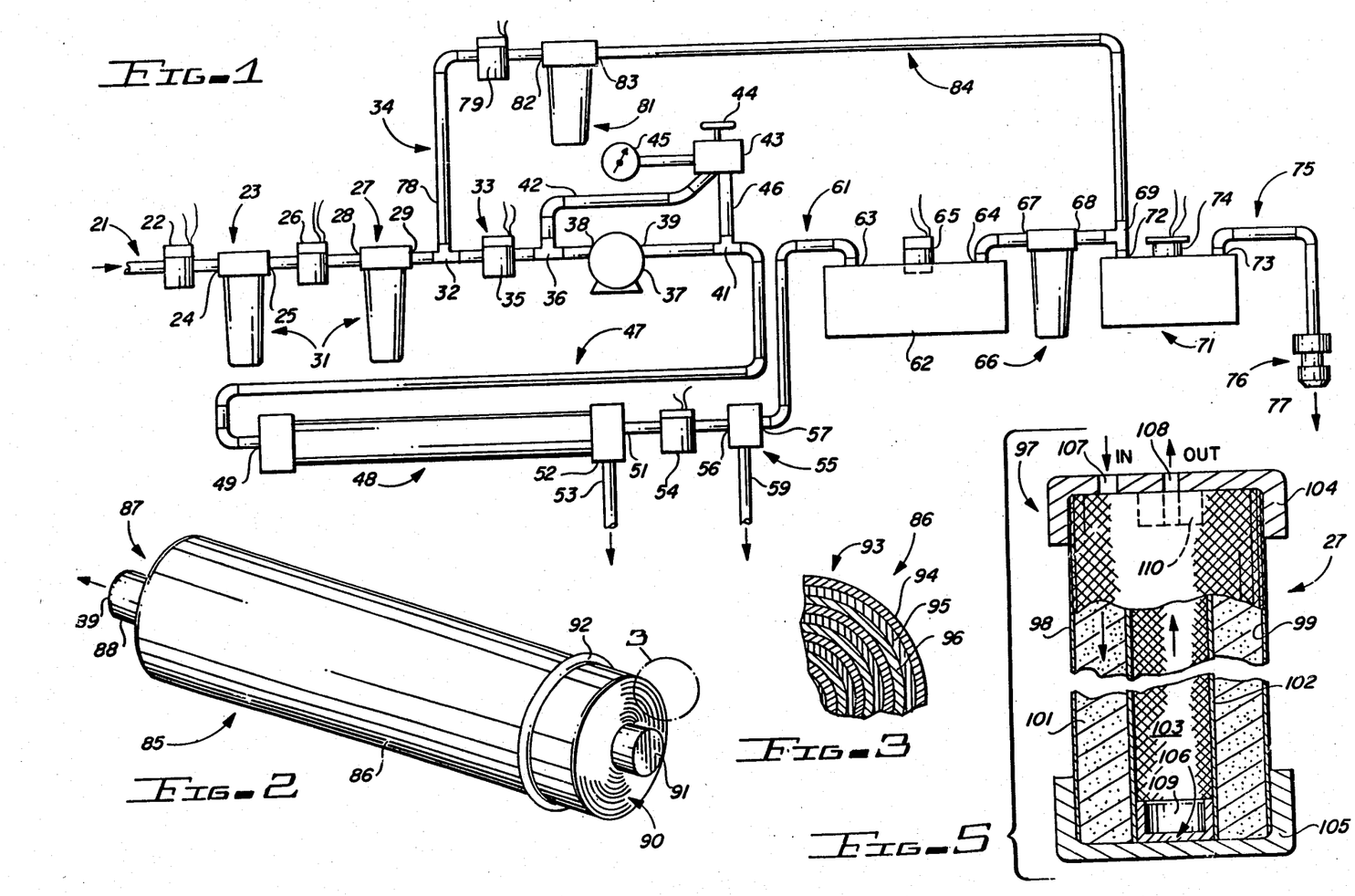
FIG. 1 is a schematic representation of the water purification and vending system of the present invention.
FIG. 2 is a perspective view of the reverse osmosis filter element of the system of FIG. 1.
FIG. 3 is a blown-up section showing that portion of FIG. 2 contained within the circle 3.
FIG. 5 is a sectional view, partially broken away, of the prefilter of the system of FIG. 1.

FIG. 1 shows an inlet 21 which is operatively coupled to a conventional supply of water for feeding water to be purified to the system of the present invention. The water may be taken from a well, reservoir, municipal water system, source of conventional or ordinary tap water, portable water truck, or any other source of water to be purified as conventionally known in the art. The inlet 21 is directly coupled through an on-off valve 22 to the inlet 24 of a first prefilter 23. The switch 22 may be normally off and activated by the presence of a vend signal or a coin-received signal which may be generated in response to the insertion or deposit of a predetermined value of specie, coin, token or the like into the machine as conventionally known in the art.

The first prefilter 23 may be, for example, a five micron polypropylene filter for stopping substantially all particles larger than five microns. The outlet of the first prefilter 23 may be operatively coupled to an input of a second normally-closed valve whose outlet is connected to the inlet 28 of a second prefilter 27. The valve 26 will also respond to turn the system on and off, as desired. The prefilter 27 may be, for example a conventional carbon-absorption or charcoal filter for removing contaminates such as chlorine and the like which may be harmful to the reverse osmosis filter as hereinafter described and for removing various harmful organic compounds and the like. The outlet 29 of the prefilter 27 is connected to one inlet of a T-fitting or joint 32. The combination of the first prefilter 23 and the second prefilter 27 are designated as prefilter 31 since either one or the other or both may be used. A first purifying water path 33 is coupled to the opposite end of the T-fitting 32 and to one input of a first path control valve 35. The valve 35 is normally-closed but is responsive to predetermined switching signals for turning on to supply water to the first path for purifying operations.

The outlet of the valve 35 is connected to a secont T-fitting 36 whose opposite end is coupled to a pump 37 via pump inlet 38. The pump outlet 39 is coupled to a third T-fitting 41 whose opposite end is coupled to a first path conduit 47. The first path conduit 47 may be, for example, metal pipe, rigid or flexible plastic tubing, or the like, as conventionally known in the art. For example, conventional flexible PVC tubing could be used. The perpendicular outlet of the T-fitting 32 is connected via a second path conduit 78 to the second drinking water path 34. The perpendicular outlet of the second T-fitting 36 is connected through a bypass conduit 42 to the input of the conventional pressure regulator 43 having a manually-adjustable pressure-setting means 44 and a pressure gauge 45. The outlet of the regulator is supplied via second bypass conduit 46 to the perpendicular outlet of the third T-fitting 41 so that the bypass path above the pump 37 can control or regulate the pressure in the system prior to pumping the inlet water to the reverse osmosis filter 48 as hereinafter described.

The first path conduit 47 is connected to the inlet 49 of a reverse osmosis filter 48. The reverse osmosis filter 48 is used for removing substantially all of the ionic and high molecular weight organic contaminates from the prefiltered water. In fact, the reverse osmosis filter element removes substantially all remaining contaminates and particulate matter from the water during the purifying or filtering process. The reverse osmosis filter 48 may include a reverse osmosis filter element, as hereinafter described, comprising layered membrane material which includes sandwiched layers of cellulose acetate or tricellulous acetate separated by a thin layer of plastic wire mesh for serving as a water communication path. Alternatively, the membrane or composite material may be a cylindrical hollow tube or cylinder comprising layers of a thin film composite including polyamide polymeric structured material. The composite normally includes three layers: (1) an inside layer of polyester support web; (2) an intermediate or interlayer of microporous polysulfone; and (3) an outer or top ultrathin barrier layer.

The reverse osmosis filter 48 has a filtered water or purified water outlet 51 and a waste water or reject water outlet 52. The pure water outlet 51 is connected through a water purification or quality sensor 54 to the inlet 56 of a 3-way valve 57. The waste water outlet 52 of the reverse osmosis filter 48 is connected through a waste water conduit 53 to a sump or drain as hereinafter described.

The 3-way valve 57 includes a purified water outlet 57 and a waste or reject water outlet 58. The reject water outlet 58 is also coupled through a reject water conduit 59 to the sump or drain as hereinafter described. The outlet 57 is connected through a further second path conduit 61 to the inlet 63 of a storage tank 62 for temporarily storing a quantity of purified water to prevent long waits at the dispenser output and to provide a sufficient supply while maintenance or the like can be accomplished. The tank 62 has a tank outlet 64 and a level sensor 65 for sensing the level of the water in the tank and turning off valve 35 in response to a full tank condition.

The tank outlet 64 is connected to an afterfilter 66 through an afterfilter inlet 67. The afterfilter 66 is provided for removing any remaining contaminates such as chlorine and for removing low molecular weight organic compounds and the like from the purified water. The outlet 68 of the afterfilter 66 is coupled to the perpendicular opening of a fourth T-fitting 69 having one outlet directly connected to an ultra-violet purifying means or disinfecting apparatus 71 via apparatus input or inlet 72.

The ultraviolet disinfecting apparatus 71 operates to kill substantially all micro-organisms in the purified water prior to its being dispensed. The apparatus 71 includes an outlet 73 operatively connected through a dispensing conduit 75 to a dispenser or nozzle 76 for supplying a predetermined quantity of purified water to a user-supplied container or the like, not shown, but known in the art, as designated by reference numeral 77.

A second drinking water path 34 is also provided in the present system. The perpendicular opening of T-fitting 32 is connected via the second path conduit 78 to the input of an on-off valve 79 which is responsive to timing and control signals for selectively activating and deactivating the second path as hereinafter described. The outlet of the valve 79 is connected to a polishing filter 81 through inlet 82 and the outlet 83 of polishing filter 81 is connected via the second path conduit 84 to the second end of T-fitting 69 for completing a second separate and distinct processing path 34 in parallel with the first purification process path 33 to the ultraviolet disinfecting means 71.

The polishing filter 81 may be, for example, similar to the afterfilter 66 and may contain a carbon absorption filter, as known in the art, or similar activated charcoal-based filter element. The polishing filter 81 serves to remove various contaminates such as chlorine, for removing low molecular weight organic compounds, and the like so that the water passing through the second path and the polishing filter 81 still retains enough of the initial minerals and the like to provide the flavor desired in drinking water as opposed to purified water.

The system of the present invention finds particular use in arid geographical regions, such as the southwestern parts of the United States, where available water may contain a high mineral content or be otherwise less pure than desired for drinking, cooking, use in automobile batteries, steam irons, radiators, and the like. The present system is also useful in areas where the water has been contaminated by environmental disasters such as gasoline leaks, chemicals, and other pollutants and contaminants, as known in the art. The present invention is adapted for either permanent or temporary installation along highways, in parking areas, parks, motel areas, apartment complexes, shopping malls, and in any location readily accessible to the automobile traveling public and is supplied with water to be purified by removing certain minerals and other impurities before it is vended in predetermined quantities.

It is desired that the water can be produced in both a purified form and in a drinking water form in which certain minerals or certain of the original (less filtered) water has been added to the purified water to add the desired or necessary flavor required by the user. The system must be able to operate independently without maintenance for prolonged periods of time.

The system of the present invention receives water from a conventional supply of water to be purified and an on/off valve 22 is responsive to a "vend" or "coin inserted" signal generated when the user deposits a predetermined value of specie, coin, token, or the like into the apparatus. When the valve 22 is opened, the supply water is received at the inlet 21 and supplied to the prefilter 23 where larger particles are removed therefrom. The water then passes through a second shutoff valve 26 to a second prefilter 27 for removing pollutants and contaminates such as chlorine which may harm the reverse osmosis filter and certain organic contaminates. A first process path 33 is provided for generating purified water and this path pumps the water via pump 37 from the prefilter outlet 29 to the input of a reverse osmosis filter 48 which removes substantially all other pollutants and contaminates therefrom. Waste water is supplied to a sump or drain via outlet 52 and purified water is supplied to a detector 54 for detecting whether or not the resulting output water is sufficiently pure.

If impure water is present, the water is diverted by the 3-way valve 57 to a waste water of reject conduit and hence to the sump or drain as hereinafter described and if good water is detected, the outlet 57 supplies the water to the holding tank 62. The level of the water in the holding tank 62 is monitored by the level detector 65 so that the purification system is shutdown when the tank is full. The good water is removed from the tank 62 and supplied to an afterfilter 66 for removing additional contaminates such as chlorine, for removing low molecular weight organic compounds, and the like. The water from the afterfilter 66 is supplied to an ultraviolet disinfecting apparatus 71 for killing substantially all microorganisms in the water which is then supplied via a dispensing means 76 to a user-supplied container 77.

A timing means is used for preselecting a first predetermined vend cycle time whose duration is sufficient to allow opening of the valve 35 and processing by the first path system 33 for supplying the predetermined quantity of water into the container. Similarly, the second signal may be produced when drinking water is selected and the valve 39 can be opened while the valve 35 is closed to initially supply the prefiltered water to the polishing filter 81 and then to the ultraviolet disinfecting means 71 prior to dispensing a relatively small amount into the container. The timing means establishes a second relatively small vend cycle time during which the valve 79 is opened and the valve 35 is closed to allow the water from the supply inlet 21 to be supplied through the second path and the polishing filter 81 to the ultraviolet disinfecting apparatus 71. This allows a second relatively small predetermined quantity of partially filtered or purified water to be added to the container 77 for providing the necessary or desired flavor required by the user.

At the end of the second vending cycle time, a third vending cycle time is initiated and a control signal turns the valve 35 on and the valve 79 off so that the purified water process path 33 is activated for supplying purified water to the dispenser 76 so that a third predetermined amount of water is dispensed into the container 77. The sum of the second vending cycle time and the third vending cycle time is equal to the first vending cycle time and to the pure water path vending cycle time while the predetermined quantity of water supplied to the container 77 is equal to the sum of the second predetermined quantity supplied by the second drinking water path and the third predetermined quantity of water supplied by the first purified water path so that said predetermined amount of water is dispensed into said container 77 regardless of whether drinking water or purified water is selected by the operator.

FIG. 2 shows a conventional reverse osmosis filter cartridge or element 85 which includes a composite cylinder or roll of sandwiched layers 86. The inlet/output end 87 of the element 86 includes a hollow cylindrical outlet stem 88 having a hollow central core or aperture 89 therethrough. The opposite or closed end 90 of the element 86 includes a solid cylindrical stop or plug member 91 and an O-ring 92 is provided about the body of the element 86 for sealing purposes as known in the art. The housing shown in FIG. 1 is conventional and is not shown in FIG. 2. The water from the inlet 24 of the prefilter 23 is received at the inlet/output end 87 and it passes through the rolls of sandwiched material about the outer periphery thereof and out the closed end 90 where it is blocked from entering the pluged end of the hollow core by plug 91. The filtered water which passes radially inward through the rolls or layers shown at the end 90 are received in the hollow central core or interior and passes out of the filter cartridge 85 through the outlet sleeve or collar 88 and the central aperture 89 passing therethrough. The material of the composite cylinder or roll 86 may be, for example, a composite cylinder or roll comprising a wound or wrapped portion including separate layers wound around the hollow core 116 to form the composite. Each composite layer of the element 93, may be, as shown in FIG. 3, a first layer 94 of cellulose acetate material, a second layer 96 of cellulose acetate material, and an intermediate layer of relatively thin mesh-like plastic material for providing a water conducting path longitudinally through the filter element 86. Each composite winding, wrapping or composite layer includes these three individual layers of material. Other membrane materials could include tricellulose acetate as manufactured by Pure Water Co. of California and a polyamide polymeric structure commonly called a thin film composite such as that manufactured by Filmtec Corporation of Minneapolis, Minn. The composite, therefore, includes repeated windings of three layers including: (1) a layer of polyester support webs; (2) an intermediate layer of microporous polysulfane; and (3) and ultrathin barrier layer on the top surface. A conventional polypropylene filter material as conventionally known in the art such as a five micron filter for stopping substantially all particles larger than five microns.

Figure 4:
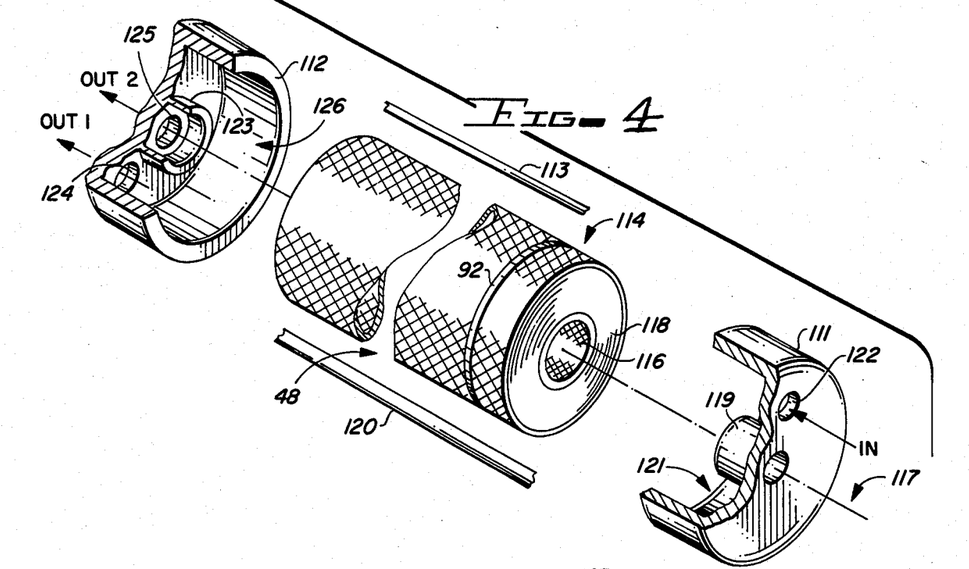
FIG. 4 is an exploded view, partially broken away, of the end portion and filter element of the reverse osmosis filter of the system of FIG. 1.

FIG. 4 shows the second prefilter 27, and similarly, the afterfilter 66 and polishing filter 81 of FIG. 1. This is a conventional carbon absorption filter, as known in the art, for removing certain contaminates such as chlorine and the like and certain organic compounds and material from the water being purified. The prefilter apparatus 27 includes a prefilter container or assembly 97 including an elongated, generally cylindrical housing 98 having a hollow interior portion 99 extending therethrough. A carbon absorption filter element 101, as conventionally known in the art, is provided within the hollow central interior 99. The carbon absorption filter element 101 includes a hollow central core 102 having a hollow central bore therethrough for the passage of filtered water as hereinafter described.

A first inlet/outlet end cap 104 is provided on one end of the housing 98 while a second or blocked end cap 105 is provided on the opposite end of the housing 98. A Blocked end cap 105 includes a cup-shaped stop socket 106 the cure to the inner central portion of the cap 105 for operatively engaging the blocked end of the core 103 to prevent the passage of water therefrom.

The inlet/outlet cap 104 includes a cap inlet aperture 107 and a cap outlet aperture 108. The cap outlet aperture 108 communicates through a collar or sleeve 110 which is operatively received within the opposite end of the core 102 for sealing the radially outer edged portions thereof and permitting the filtered water therein to pass out of the filter 27 through the outlet 108.

In operation, the incoming water to be filtered enters the inlet aperture 107 and passes into the end portion 90 of the filter element 85 as shown in FIG. 2. As the water passes through the carbon absorption filter element 101, it is filtered through the element and enters the core 102. The water reaching the opposite end cap 105 cannot exit due to the end cap 105 and plug 109 within the core 102. The purified or filtered water passing through the carbon absorption media 101 is received within the core 103 and passes upwardly therein to exit through the apertured collar or sleeve 110 and the filtered water outlet 108 for further processing as described with respect with filters 27, 66, and 81 of FIG. 1. The particular structure and design of particular carbon absorption or carbon-activated filters including both the filter element themselves and the housings are conventional and well-known in the art.

FIG. 5 illustrates the reverse osmosis filter 48 of FIGS. 1 and 2 and shows the filter 48 as including a first inlet end cap 111 and a second or outlet end cap 112. The caps are adapted to fit over opposite ends of a housing 120 having an interior surface 113 defining an elongated hollow interior for receiving a reverse osmosis filter element 114 therein. The reverse osmosis filter element may be, for example, a composite cylinder or roll comprising a wound or wrapped portion including separate layers wound around the hollow core 116 to form the composite. Each composite layer of the element 93, may be, as shown in FIG. 3, a first layer 94 of cellulose acetate material, a second layer 96 of cellulose acetate material, and an intermediate layer of relatively thin mesh-like plastic material for providing a water conducting path longitudinally through the filter element 86. Each composite winding, wrapping or composite layer includes these three individual layers of material. Other membrane materials could include tricellulose acetate as manufactured by Pure Water Co. of California and a polyamide polymeric structure commonly called a thin film composite such as that manufactured by Filmtec Corporation of Minneapolis, Minn. The composite, therefore, includes repeated windings of three layers including: (1) a layer of polyester support webs; (2) an intermediate layer of microporous polysulfane; and (3) and ultrathin barrier layer on the top surface, as previously described.

FIG. 5 shows the inlet end cap 111 as including an elongated central plug 119 for engaging the core 116 to prevent the escape filtered water therefrom. The end cap 111 also includes a hollow annular space 121 for circulating the water supplied through inlet 122 for passage through the composite layers of the end portion 118 as known in the art. The outlet end cap 112 includes a cup-shaped collar or sleeve 123 adapted for operatively engaging the opposite end of the core 116 for sealing it from leakage and a pure water outlet 125 through the center of the collar 123 for receiving the filtered water from the inner core 116 for supplying purified water to the storage tank 62 of FIG. 1. The end cap 112 also includes a waste or reject water outlet 124 in a pereferal portion of the cap 112 for outputting waste or reject water from the annular space 126 which represents the water passing through the composite portion 118 without being filtered to the core 116 and hence impure or waste water.

Figure 6:
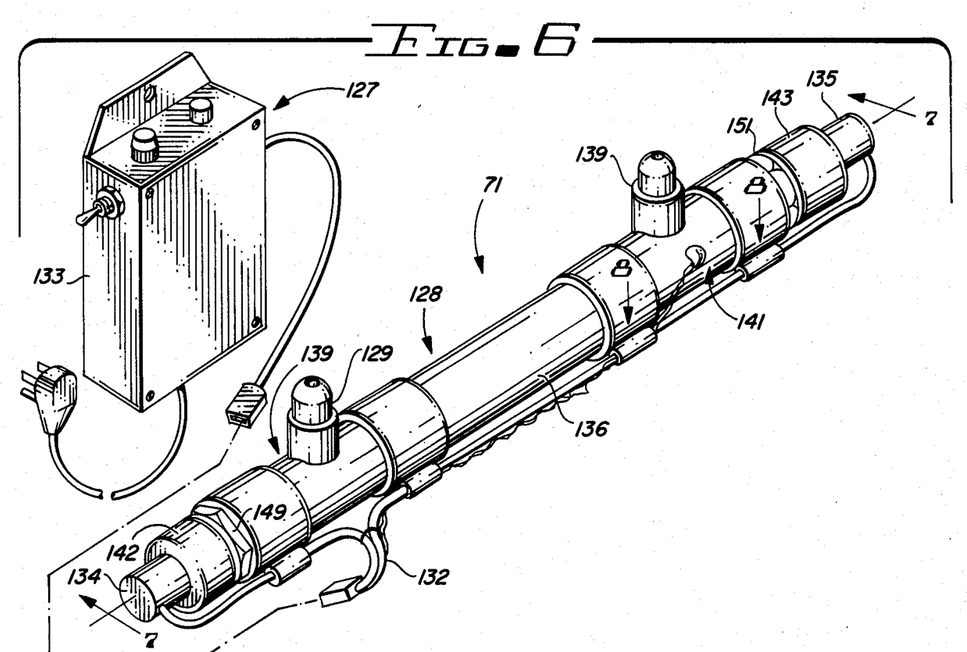
FIG. 6 is a perspective view of the ultraviolet purifying or disinfecting apparatus of the present invention and the power supply therefore.

FIG. 6 shows the ultraviolet purifying or disinfecting apparatus 71. The apparatus 71 is shown as including a power supply system 127 and an elongated, generally cylindrical housing 128. The housing 128 has a water inlet 129 and a water outlet 131. The electrical power supply 127 is connected through wires 132, electrical connectors, conduits, or the like to the lamp of FIG. 6 as hereinafter described. The housing 128 includes a first end cap 134 and a second end cap 135 electrically coupling opposite ends of the lamp to the electrical power supply 127 through connectors 132.

The generally cylindrical elongated housing 128 includes a central sleeve portion 136, a first flanged connecting sleeve 139, and a second flanged connecting sleeve 141. A first lamp-mounting collar 142 and a second lamp-mounting collar 143 are provided for securing the first end cap 134 and the second end cap 135 to the lamp within the cylindrical housing 128 as hereinafter described.

Figures 7A, 7B, 8:
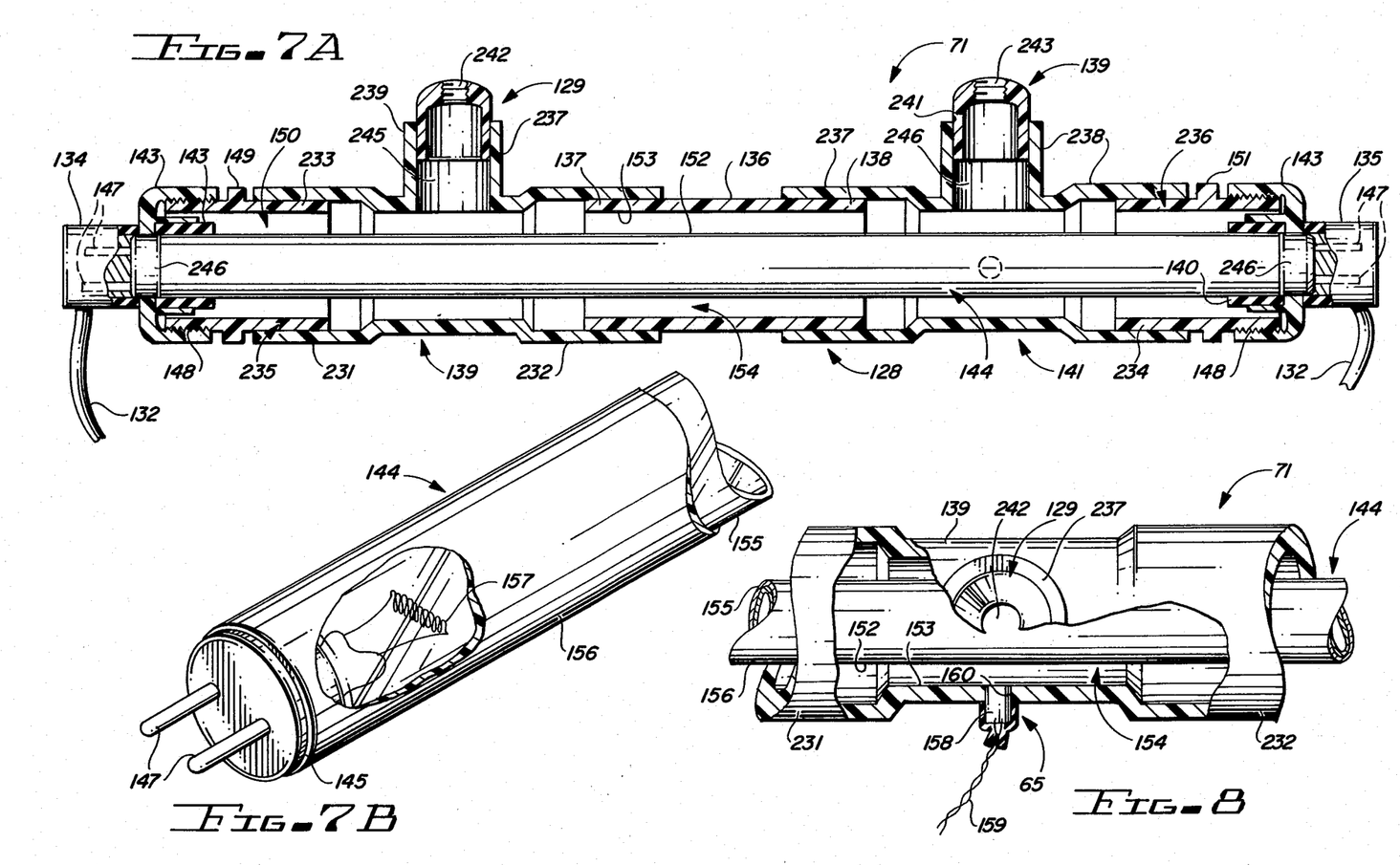
FIG. 7A is a sectional view of the ultraviolet purifying or disinfecting apparatus of FIG. 6.
FIG. 7B is a perspective view, partially broken away, showing the lamp element and plastic coating of the ultraviolet lamp of the apparatus of FIG. 7A.
FIG. 8 is a perspective view, partially broken away and partially sectioned, of a portion of the ultraviolet purifying or disinfecting apparatus of FIG. 6.

FIG. 7A shows a sectional drawing of the ultraviolet disinfecting device 71 of FIG. 6. FIG. 7A helps show the elongated, generally cylindrical housing 128 as including the central sleeve portion 136 having opposite sleeve end portions 137 and 138. A first flanged connecting sleeve 139 has a first outwardly flanged portion 231 and a second outwardly flanged porton 232. The outwardly flanged portion 232 of the sleeve 139 is adapted to securably receive the end portion 137 of the central sleeve 134 therein. The opposite flanged end portion 231 of the sleeve 139 is adapted to receive the non-threaded end portion 233 of the member 235 therein in a sealable or securable manner. The member 235 has an opposite, radially outwardly threaded portion 148 and an intermediate outwardly extending lip 149. The cup-shaped end cap 142 has an interiorally threaded portion for engaging the threads of the end portion 148 for selectively securing and unsecuring the end cap portion 142 therefrom for changing the bulb or lamp 144 or the light. The end cap 246 of the bulb 144 has a pair of electrically engaging prong members 147 extending therefrom and an electrical prong-engaging member or cap 134 is provided for engaging the prongs or pins 147 for connecting them to the power supply 127 via the wire 132.

The second flanged connecting sleeve 141 includes a first flanged end portion 237 for receiving the opposite end portion 138 of the central sleeve 136 securely therein. The opposite flanged portion 238 of the sleeve 141 is adapted for receiving the unthreaded portion 236 of the element 234 therein. An annular llip 151 or nut-like portion is provided extending radially outward from the member 234 and the opposite threaded end portion 148 has threads radially outwardly disposed thereon. A threaded cup-like end cap 143 has its opened portion interiorally threaded for operatively engaging the threads of said portion 148 for securing and unsecuring the end cap 143 therefrom for changing the lamp 144 and the light. The end cap 143 also includes a lamp-mounting collar 140 for securing the opposite end portion of the lamp 144 therein so as to position it centrally within the hollow interior of the housing 128 and substantially aligned with, and preferably coaxial with, the longitudinal axis thereof. The end of the lamp 144 is sealed by portion 246 and the prongs 147 extending therefrom are engaged by prong-receiving or pin-receiving sockets within the connector 135 for connecting the prongs 147 to the power supply 127 of FIG. 1 via the wire 132.

The inlet 129 of the ultraviolet disinfecting apparatus 71 includes a cup-shaped portion 239 and a closed end portion with an inlet aperture 242 therethrough. The shaped end portion 239 is adapted to be received within a hollow collar 237 for communicating the inlet aperture 242 with the interior 245 of the housing 128 and the hollow annular space 154 formed between the outer surface 152 of the lamp 144 and the radially inner surfaced 153 of the sleeve 128. The space 245 communicates directly with the annular space 154 and supplies a flow or stream of water about the lamp 144 and through the annular space 154 to the outlet 139. The outlet 139 includes a generally cup-shaped portion 241 and a closed end portion having an outlet apperture therethrough. The outlet apperture communicates through the cup-like portion 241 which is secured within a hollow collar 238 to connect the outlet 243 with a hollow portion 246 communicating directly with the annular space 154 so that the water flowing into the inlet 242 is conducted through the hollow annular space 154 for purifying or disinfecting with ultraviolet light and then supplied out of the outlet aperture 243 for dispensing purposes.

FIG. 7B shows a perspective view, partially broken away, of a portion of the lamp 144 of FIG. 7A. The lamp 144 includes an inner glass shell or envelope 155 surrounded, wrapped or covered with a relatively thin film or layer 156 of plastic-like material such as a heat-shrunk plastic tetraflouroethylene material which maintains the surface of the glass bulb or tube 155 out of contact with the water passing through the annular space 154 so as to prolong the life of the bulb and the light. The bulb element 157 is connected through the end plug 145 to the prongs 147 for completing an electrical connection therebetween. When power is supplied to the prongs 147 via the electrical connectors or wires 132, the element 157 is powered to cause the emission or radiation of ultraviolet rays for purifying or disinfecting the water passing through the apparatus 71.

FIG. 8 shows a perspective view, partially broken away, of a portion of the apparatus 71 of FIG. 7A. FIG. 8 shows the first flanged sleeve portion 139 provided with an aperture 160 for receiving an ultraviolet sensor element 158 therein. The ultraviolet sensor element 158 is connected through an electrical nectar 159, wire, lead, or the like for providing an output signal indicative of the operation of the ultraviolet disinfecting apparatus 71 as hereinafter described.

The well-publicized chlorine by-products that are often found resulting from the widespread chlorination of water prevalent today and that become produced at levels suspected to be carcinogenic together with the cost, hazards and mechanical problems associated with chlorine have all led engineers, users, and regulatory agents to seek alternative methods of disinfection. The use of ultraviolet light is a leading candidate for a number of such applications. Ultraviolet disinfection of water as used in the present invention employs a low-pressure mercury lamp 144. The lamp 144 generates short-wave ultraviolet light in the region of 253.7 nanometers which is lethal to substantially all micro-organisms such as bacteria, protozoa, viruses, molds, yeasts, nematode eggs, algae, and the like. The actual mechanism of micro-organism destruction by ultraviolet light is currently believed to be that ultraviolet light causes molecular rearrangement in the DNA and RNA which in turn blocks replication. While there is no universally accepted minimum dosage required for ultraviolet disinfection systems, the U.S. Public Health Service published a policies statement which suggested a drinking water dosage requirement of 16,000 uWs/cm. This has formed the basis of several standards published throughout the world and the germicidal residual dosage after one year of operation is normally between 28,000 and 30,000 watt-seconds per square centimeter. This exceeds the standard by a factor of 1.79 to 1.92. These figures are impressive for the present system considering that the dosage has shown to provide up to 99.9 percent reduction in bacteriological counts.

Furthermore, the material of the elongated cylindrical sleeve or housing 128 may include a resilient plastic material such as polyvinylchloride or pvc for increased durability and reduced lower thermal conductivity for increasing the life of the system. Furthermore, sponge-like mountings can be provided for mounting or securing the ultraviolet disinfecting apparatus 71 within the vending machine apparatus for greatly increased shock resistance to further prolong the life of the system.

The sense or ultraviolet detector 65 senses or detects intensity only generates a signal indicative thereof for subsequent use. It has been found that changing between an initial 50 percent to 100 percent of power greatly increases the life of the lamp 144 and decreases the heat dissipated thereby.

Figure 9:
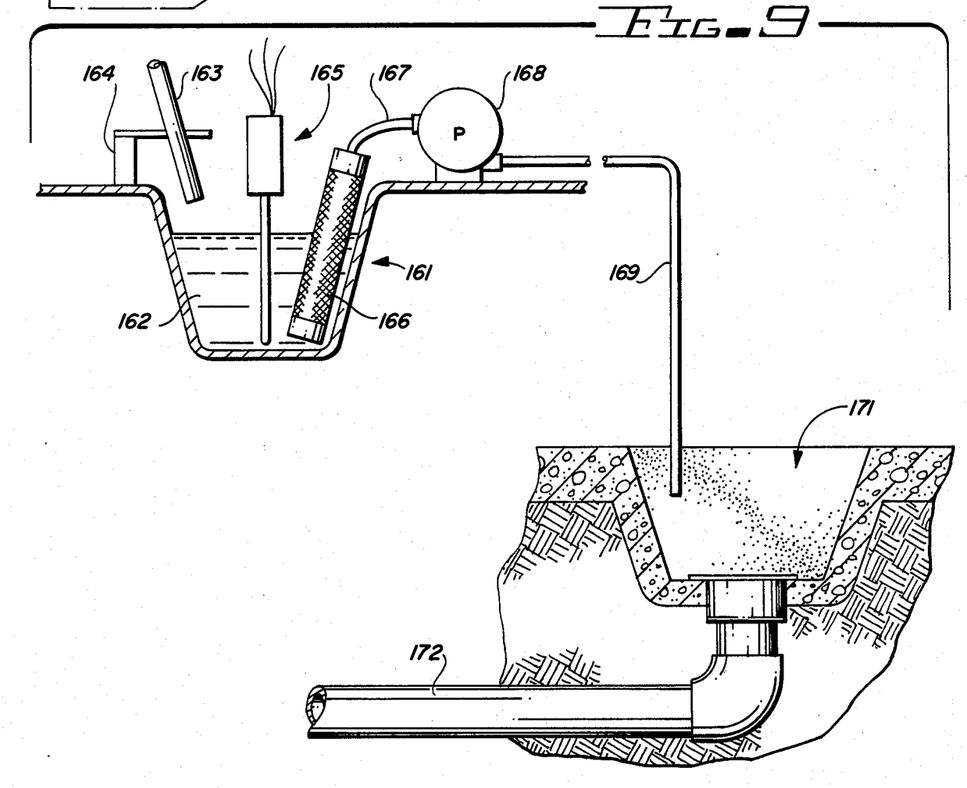
FIG. 9 is a schematic representation of the temporary holding sump and drain system used in the present invention.

FIG. 9 illustrates the apparatus of the present invention as having an internally contained temporary holding sump 161. The sump 161 is adapted for containing or holding waste or reject water 162 supplied from the waste or reject water conduits 163 as previously described. The conduits 163 are positioned adjacent the sump 161 by a stand-off 164. The sump 161 also includes a level detector 165 for supplying a full signal or indication whenever the level of the waste water 162 in the sump 161 is reached a full or maximum level for turning on a pump 168 to pump the waste water 162 out of the sump 161 through a filter 166 and a conduit 167. The pump output is connected via conduit 169 and empties into a conventional drain 171 and a sore pipe 172 or the like.

Figure 10:
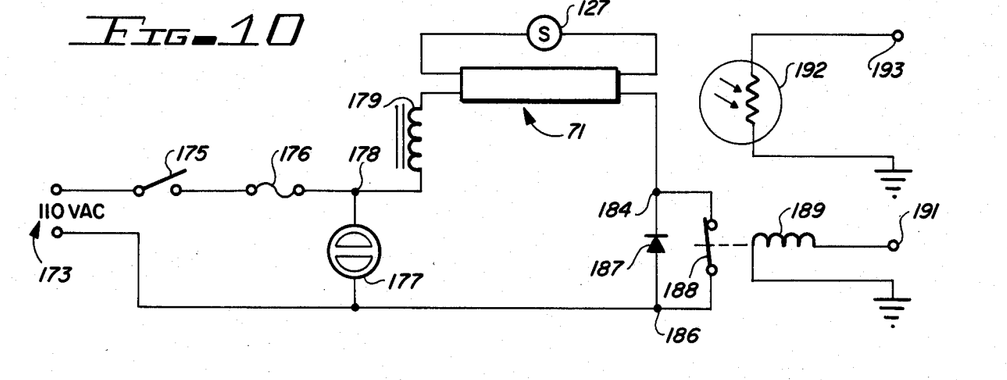
FIG. 10 is an electrical schematic diagram of the lamp control system of FIG. 6.

FIG. 10 shows a circuit wherein a 110 volt input 173 is supplied by a lead 174 through a normally-opened switch 175 to represent a power switch or the like. The opposite terminal of switch 175 is connected through a fuse 176 to a node 178. Node 178 is connected to one terminal of a resistive coil 179 configured as a 25 watt ballast and the opposite terminal is connected to the ultraviolet lamp 71. The lamp 71 completes the circuit through lead 183 to node 184. Lead 185 is connected to node 186 and then to the cathode of a diode 187 whose anode is connected directly to node 184 to complete the ballast circuit. Node 186 is connected to node 184 through a normally-closed relay-operated switch 188. The switch 188 is operated by the relay coil 189 which has one terminal connected to ground and its opposite terminal connected to input node 191 for receiving the relay operating signal.

The ultraviolet lamp 71 has a second circuit connected to the opposite terminals of the lamp through a power supply 127. The duction and intensity of the lamp 71 is sensed by a photocell 192 which acts as the sensor 65 of FIG. 1 and outputs an ultraviolet sensor signal on lead 193. The signal on lead 193 represents the kill power of the apparatus which is a function of the intensity of the ultraviolet light. The kill power is not to be confused with the percentage or number of bacteria killed and 50 percent kill power actually kills substantially all micro-organisms present in the water.

Figure 11:
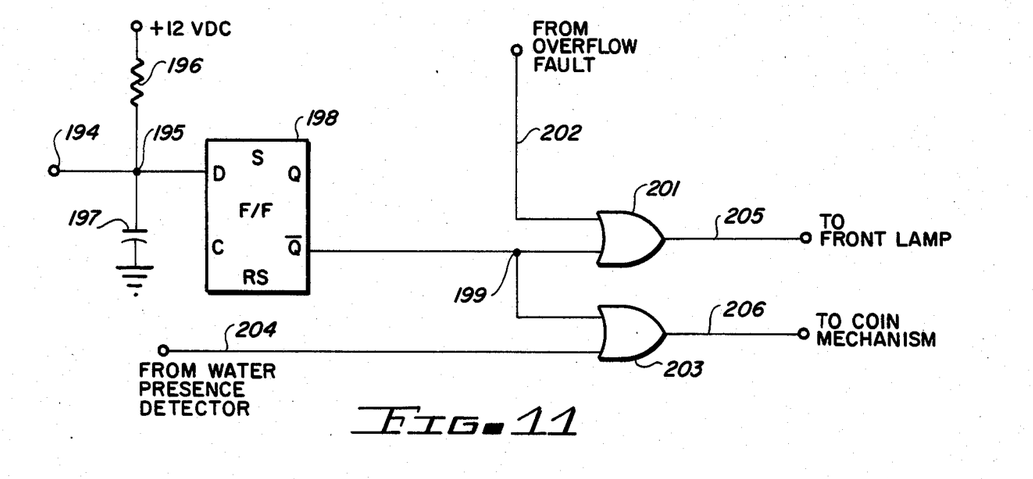
FIG. 11 is an electrical schematic diagram of a circuit for generating various control signals.

FIG. 11 shows a schematic diagram having an input 194 connected to an input node 195. Node 195 is connected to a plus 12 volt source of DC power through a resister 196 and to ground through a capacitor 197. Node 195 is also connected directly to the "D" input of a "D"-type flip-flop 198 whose inverting output $\bar{Q}$ is connected directly to output node 199. Node 199 is connected to a first input of a two input logical OR GATE 201 whose opposite input is connected by a lead 202 to a signal from the overflow fault detector as previously described. Node 199 is also connected to a first input of a second 2-input logical OR GATE 203 whose opposite input is connected via lead 204 to receive an input signal from the water presence detector 65 of the tank 62. The output of OR GATE 201 is taken from lead 205 to the front lamp of the vending machine for indication purposes while the output of OR GATE 203 is taken via lead 206 to the coin mechanism.

Figure 12:
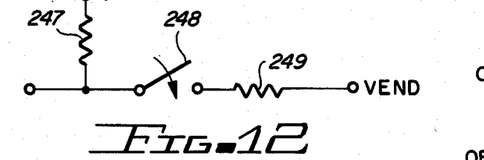
FIG. 12 is a simplified electrical schematic representing a circuit for generating a "vend" signal when a coin is deposited.

Various other circuits for generating conventional vending machine signals will now be briefly described. FIG. 12 shows a schematic representation of a simplified circuit responsive to the deposit of a particular value of specie, coin, token or the like for generating a "vend" or "coin-received" signal. In FIG. 12, a source of potential is connected through a resistor 247 to one terminal of a normally-open switch 248 which represents the deposit of the predetermined amount or value into the machine. The opposite terminal of switch 248 is connected through a resistor 249 to supply the vend or coin-received signal to subsequent control circuitry and the like.

Figure 13:
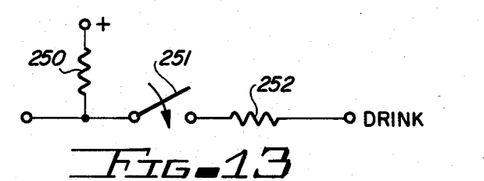
FIG. 13 is a simplified electrical schematic representing a circuit for generating a purified water or drinking water selected signal.

FIG. 13 shows a source of potential connected through a resister 250 to the terminal of a 2-way switch 251 which is normally closed to ground but which can be manually-operated to select either a drinking water path via output lead 252 or a purified water path via output lead 253 depending upon which of the two switch positions the switch 251 is moved to from the neutral or grounded position. These signals are used to indicate whether the user has selected drinking water or purified water as previously described.

Figure 14:
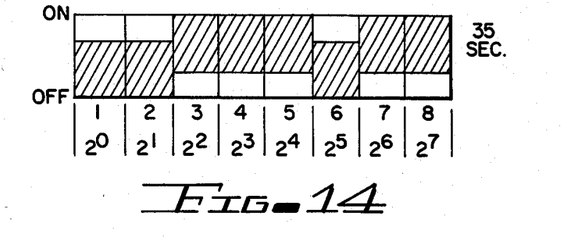
FIG. 14 shows a rotary switch apparatus used for selecting time intervals.

Means are also provided for selecting at least first, second and third vending cycle times as by conventionally manually-operable rotary switches for representing a particular time interval or vending time cycle period in seconds in binary form. FIG. 14 illustrates an example of one such conventional rotary-operated binary switch assembly 254.

Figure 15:
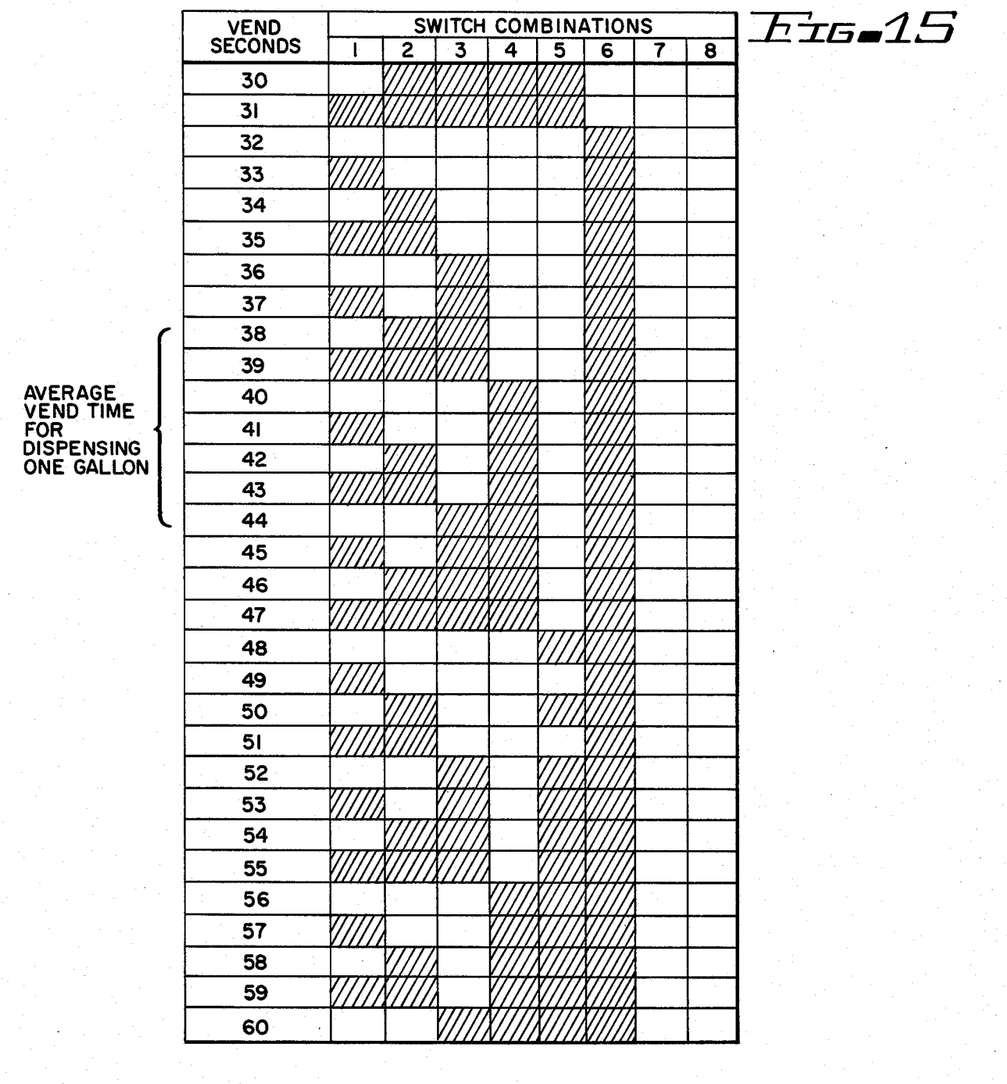
FIG. 15 shows a switching table for setting desired cycle time by the binary switches of FIG. 14.

Lastly, the vending cycle times can be illustrated or represented by switching tables, only one of which is shown in FIG. 15. FIG. 15 represents the vending time cycle or period in seconds as encoded on the rotary switch combination of FIG. 14 in binary form as represented by the eight switch positions 1–8 corresponding to the binary numbers $2^0, 2^1, \ldots 2^8$. The example shown in FIG. 14 shows the switches positioned for 35 seconds and the timing table of FIG. 15 shows the switch combination corresponding thereto.

The control circuitry operated by the above-generated signals for controlling the operation of the valves 22, 26, 35, 55, and 79 are conventional utilizing the signals set forth above and will not be described in detail herein.

The present invention also contemplates a method of producing purified water from a source of water and vending a predetermined amount of purified water comprising the steps of coupling the source of water to a prefilter and prefiltering the water to remove particulates, chlorine, organic materials and the like. The method further includes utilizing reverse osmosis to remove substantially all remaining particulates, contaminates and the like and outputting purified water to a storage tank and discharged waste water to a sump; temporarily storing the purified water and after filtering the purified water from the tank to remove any remaining contaminates including chlorine, low molecular weight organic compounds and the like. This step is followed by immersing the afterfilter of water in ultraviolet light for killing substantially all micro-organisms and the like to produce truly purified water and then dispensing a predetermined amount of purified water into a user-supplied container or the like.

The method also includes the steps of establishing a predetermined vend time cycle period as required for dispensing said predetermined amount of purified water into the container; initiating the vending time cycle period and response to the deposit of a predetermined value of specie, coin, token or the like; and terminating the dispensing operation at the end of the predetermined vend time cycle period as a measure of the predetermined amount of purified water dispensed.

The method also contemplates the additional steps of establishing a second and third predetermined voltage time cycle time for defining a drinking water dispensing time; manually selecting at least one of purified water and drinking water; initiating the dispensing of drinking water at the start of the second predetermined vend time cycle period when said drinking water is selected; terminating the dispensing of drinking water at the expiration of the second vending time cycle period; initiating the dispensing of purified water at the start of the third predetermined vending time cycle period and terminating the dispensing of purified water at the end of the third predetermined vending time cycle period for mixing the drinking water with the purified water to add taste thereto while insuring that the amount of water dispensed is equal to the predetermined quantity desired.

Yet further, the method contemplates defining first and second different and distinct purified water and drinking water paths, respectively, and then filtering the source water in the second drinking water path to remove any remaining contaminates including chlorine and low molecular weight organic compounds while retaining enough minerals to add taste to the drinking water and beginning the dispensing operation substantially immediately without waiting for reverse osmosis delay.

The method also includes monitoring the reverse osmosis filtered water for purity, normally directing good water to the holding tank and diverting bad water to the holding sump in response to the detection thereof by said monitoring step.

Yet further, the method includes providing a generally cylindrical housing having a hollow interior portion with a longitudinal axis therethrough; placing a low pressure mercury lamp within the hollow interior of the housing and substantially aligned with the axis; wrapping the lamp with a layer of relatively thin plastic material to reduce contact between the surface of the lamp and the water. Additionally providing a relatively small annular space between the outer periphery of the lamp and the inner surface of the housing and disinfecting the purified water by flowing it in one end of the housing, over the lamp through the hollow annular space and out the opposite end portion to kill substantially all micro-organisms therein prior to dispensing the water into the container.

With this detailed description of the specific method and apparatus used to illustrate the preferred embodiment of the present invention and the operation thereof, and to illustrate various alternate embodiments and the method thereof, it will be obvious to those skilled in the art that various modifications and changes can be made in the present invention without departing from the spirit and scope of the invention, which is limited only by the appended claims.

What is claimed is:

1. An improved water vending system for dispensing a predetermined amount of purified water into a portable container in response to the deposit of specie, coin, token or the like, the system having a system inlet operatively coupled to a source of water, means for dispensing water into the container, reverse omosis filter means, prefilter means coupling the system inlet to the reverse osmosis filter means, means coupling the reverse omosis filter waste water to a holding sump, a purified water holding tank coupled to the reverse osmosis filtered water outlet, an after filter coupled to the tank outlet, an ultraviolet disinfecting means coupled between the afterfilter outlet and the dispensing means, means for establishing a predetermined vending cycle time period and means responsive to the time period for controlling the predetermined amount of purified water dispensed, wherein the improvement comprising;

said ultraviolet disinfecting means including an elongated, generally cylindrical housing having a hollow interior and a central longitudinal axis through said interior;

a housing inlet adjacent one end portion of said housing and generally normal to said axis for operatively coupling said afterfilter outlet to said interior;

a housing outlet adjacent the opposite end portion of said housing and generally normal to said axis for operatively coupling said interior to said dispensing means;

at least one elongated ultraviolet lamp operatively disposed within said interior and generally aligned with said axis, the outer diameter of said lamp being slightly less than the inner diameter of said hollow housing for establishing a relatively small annular space about said lamp and at least between said housing inlet and said housing outlet;

a layer of plastic means about said lamp for preventing the surface of the lamp from directly contacting the water flowing within the annular space;

means for applying operating power to said lamp;

manually-operable means for selecting at least one of purified water and drinking water and for generating a signal indicative thereof;

a first purified water path operatively coupling said prefilter means outlet to said ultraviolet disinfecting means;

said first purified water path including said reverse omosis filter means, said tank, and said afterfilter means for removing substantially all impurities, particulates, contaminates, and the like from the water before dispensing a first predetermined quantity of substantially only purified water;

a second drinking water path including a polishing filter means operatively coupled between said prefilter means outlet and said ultraviolet disinfecting means for supplying a second predetermined quantity of water to said dispensing means for providing water without waiting for the reverse osmosis filter means delay and for adding minerals and the like for drinking water flavor; and said control means responsive to said purified water signal for operating said first path for a first vending cycle time period for dispensing said first quantity of purified water, said first quantity of purified water being equal to said predetermined amount to be dispensed, and responsive to said drinking water signal for initially operating said second path for a second relatively short vending cycle time period and for switching to said first path at the end of said second vending cycle time period and dispensing purified drinking water for a third vending cycle time period until said predetermined amount has been dispensed.

2. An improved water vending system for dispensing a predetermined amount of purified water into a portable container in response to the deposit of specie, coin, token, or the like, the system having a system inlet operatively coupled to a conventional source of water, means for dispensing water into the container, reverse osmosis filter means, prefilter means coupling the system inlet to the reverse osmosis filter means, means coupling the reverse osmosis filter waste water to a holding sump, a purified water holding tank coupled to the reverse osmosis filter water outlet, an afterfilter coupled to the tank outlet, and an ultraviolet disinfecting means coupled between the afterfilter outlet and the dispensing means, the improvement comprising:

manually-operable means for selecting at least one of purified and drinking water and a generating signal indicative thereof;

manually-operable means for establishing a predetermined first, second, and third time period;

means responsive to the established time period for controlling the first, second, and third predetermined amount of water dispensed, respectively;

a first purified water path operatively coupling said prefilter means outlet to said ultraviolet disinfecting means;

said first purified water path including said reverse osmosis filter means, said tank, and said afterfilter means for removing substantially all impurities, particulates, contaminates, and the like from water for dispensing said first predetermined quantity of substantially only purified water;

a second drinking water path including a polishing filter means operatively coupled between said prefilter means outlet and said ultraviolet disinfecting means for supplying a second predetermined quantity of water to said dispensing means for providing water without waiting for the reverse osmosis filter means delay and for adding minerals and the like for drinking water flavor;

said control means responsive to said purified water signal for operating said first path for said first time period for dispensing said first quantity of purified water, said first quantity of purified water being equal to said predetermined amount of water, and responsive to said drinking water signal for initially operating said second path the said second time period to initially dispense said second predetermined quantity of water and for switching to said first path at the end of said second time period and dispensing purified drinking water for said third time period until said predetermined amount of water has been dispensed, said ultraviolet disinfecting means including an elongated, generally cylindrical housing having a hollow interior and a central longitudinal axis through said interior;

a housing inlet adjacent one end portion of said housing and generally perpendicular to said axis for operatively coupling said afterfilter outlet to said interior;

a housing outlet adjacent the opposite end portion of said housing and generally perpendicular to said axis for operatively coupling said interior to said dispensing means;

at least one elongated ultraviolet lamp operatively disposed within said interior and generally aligned with said axis, the outer diameter of said lamp being slightly less than the inner diameter of said hollow housing for establishing a relatively small annular space about said lamp and at least between said housing inlet and said housing outlet for establishing a flow path therebetween;

and a layer of relatively thin plastic material about said lamp for preventing the surface of the lamp from directly contacting the water flowing within the annular space to prolong the life of the lamp.

3. A method of producing purified water from a source of conventional tap water and vending a predetermined amount of purified water comprising the steps of:

coupling the source of tap water to a prefilter;

prefiltering the water to remove particulates chlorine, organic materials, and the like;

utilizing reverse osmosis to remove substantially all remaining particulates, contaminates, and the like to output substantially purified water and to discharge waste water to a temporary sump;

temporarily storing the purified water in a holding tank;

afterfiltering the partially purified water to remove any remaining contaminates including chlorine, low molecular weight organic compounds, and the like;

immersing the afterfilter water in ultraviolet light for killing substantially all micro-organisms and the like to produce purified water;

dispensing said predetermined amount of purified water to a container;

establishing a predetermined cycle time as required for dispensing said predetermined amount of purified water into said container;

initiating the cycle time in response to the deposit of a predetermined value of specie; and terminating the dispensing of purified water into the container at the end of said timing period thereby measuring said predetermined amount of purified water dispensed;

providing a generally cylindrical housing having a hollow central interior with a longitudinal axis therethrough;

placing a low pressure mercury vapor lamp within said housing interior substantially aligned with said axis;

wrapping the lamp with a layer of relatively thin plastic material for preventing contact with the water and prolonging the life of the lamp;

providing a relatively small annular space between the outer perimeter of the lamp and the inner surface of the housing; and disinfecting the purified water by flowing it through the annular space and over the lamp to substantially kill all micro-organisms therein prior to the dispensing operation.

4. A water purification system adapted to be connected to a conventional source of tap water for purifying the water prior to vending a predetermined quantity thereof into a user-supplied container comprising:

prefiltering means for removing particulates larger than a predetermined molecular size, contaminates such as chlorine and the like, and various organic compounds from the water to be purified, said prefiltering means including an inlet operatively coupled to said conventional source of tap water and an outlet;

a first purified water flow path;

a second drinking water flow path;

said first purified water flow path including a reverse osmosis filter means for removing substantially all remaining undesirable particulate and contaminates from the prefiltered source water, said reverse osmosis filter means having an inlet operatively coupled to the outlet of said prefiltering means, a waste water output, and a purewater output;

storage tank means for temporarily storing the reverse osmosis filtered water from the purewater outlet of said reverse osmosis filter means, said storage tank means having a tank inlet operatively coupled to the purewater outlet and a tank outlet;

afterfilter means for filtering out any remaining contaminates, including chlorine, low-molecular weight organic compounds, and the like from the stored reverse osmosis filtered pure water, said afterfilter means having an inlet operatively coupled to said tank outlet, and an afterfilter outlet;

ultraviolet purifying means for disinfecting the afterfiltered water for removing micro-organisms and the like to reduce relatively pure water for dispensing purposes;

dispensing means for supplying said predetermined quantity of purified water into said container;

manually-operable means for selecting at least one of pure water and drinking water and generating a signal indicative thereof;

means responsive to the deposit of a predetermined value of at least one of specie, coin, token, and the like for generating a coin-received signal;

means for establishing a first predetermined vending cycle time whose duration is sufficient for dispensing said predetermined quantity of purified water;

means for establishing a second relatively short predetermined vending cycle time sufficient for dispensing a relatively small second predetermined quantity of drinking water for flavoring the purified water for drinking purposes;

means for establishing a third predetermined vending cycle time whose duration is sufficient for dispensing a third predetermined quantity of purified water such that the sum of the second and third vending cycle times is approximately equal to the value of the first predetermined vending cycle time and the sum of the second and third predetermined quantities are equal to said predetermined quantity be dispensed;

first valve means operatively disposed in said first path and responsive to said purified water signal for opening to allow supply water from said conventional source of tap water to flow into said first path;

second valve means operatively disposed in said second path and responsive to said drinking water signal for opening to introduce water from said conventional source of tap water to that second path; and means responsive to said drinking water signal for initially maintaining said second valve means open until the expiration of said second vending cycle time and then closing said second valve means and simultaneously opening said first valve means for supplying said third predetermined quantity of purified water to said container for the duration of said third vending cycle time to dispense a total quantity of water equal to said predetermined quantity to said container wherein said ultraviolet disinfecting means further includes:

a generally cylindrical housing having an elongated interior portion and a longitudinal axis therethrough;

an ultraviolet lamp operably coupled within said hollow interior between opposite ends of said housing and aligned with said axis;

means for supplying operating power to said ultraviolet lamp;

heat-shrunk plastic material means surrounding said ultraviolet lamp for preventing the lamp from actually contacting the water flowing therethrough;

the outer diameter of said ultraviolet lamp being less than the inner diameter of said housing interior for providing a relatively small annular space around said ultraviolet lamp for conducting the water flowing through the ultraviolet purifying means; and said housing having an inlet operatively coupled to the outlet of said afterfilter means and an outlet operatively coupled to said dispensing means.

5. The system of claim 4 wherein said heat-shrunk plastic material means includes tetraflouroethylene for protecting the lamp, said housing includes polyvinylchloride for reducing thermal conductivity, and said ultraviolet disinfecting means includes sponge-like mounting means for mounting said disinfecting means for improving the shock resistance thereof.

6. An improved water purifying system for purifying water from a conventional supply of tap water and dispensing a predetermined quantity of water into a user-supplied container in response to the deposit of a predetermined value of specie, coin, token, or the like, the improvement comprising: prefilter means for removing particulates larger than a predetermined size, for removing contaminates such as chlorine and the like which may be harmful to the reverse osmosis process, and for removing various organic compounds and the like, said prefilter means having an inlet operatively coupled to said conventional supply of tap water and an outlet; reverse osmosis filter means for removing substantially all remaining undesirable particulates and contaminates from the prefiltered water, said reverse osmosis filter means including an inlet operatively coupled to said prefilter outlet, a waste water outlet, and a filtered water outlet; a holding tank means for temporarily storing the reverse osomosis filtered water, said storage tank means having a tank inlet operatively coupled to the filtered outlet of said reverse osmosis filter means and a tank outlet; after filter means for filtering out any remaining contaminates including chlorine, low-molecular weight organic compounds, and the like from the purified water stored in said tank means, said afterfilter means having an inlet operatively coupled to said tank outlet and an afterfilter outlet; ultraviolet disinfecting means for removing substantially all microorganisms from the purified water prior to the dispensing thereof, said disinfecting means having an inlet operatively coupled to the afterfilter outlet and a disinfecting means outlet; dispensing means operatively coupled to said disinfecting means outlet for supplying a predetermined quantity of said purified and disinfected water to said user-supplied container, the improvement comprising:

said disinfecting means having a generally cylindrical housing including a hollow interior portion with a longitudinal axis extending therethrough;

a low voltage mercury-vapor ultraviolet lamp operatively mounted between opposite end portions of said housing within said hollow interior and aligned generally with said axis;

the radially outer diameter of said lamp being less than the radially inner diameter of said housing interior for forming a hollow annular space about said lamp for conducting purified water therethrough for disinfecting purposes;

a disinfecting means inlet approximate one end portion of said housing for communicating the afterfilter outlet to one end portion of the interior of said housing;

disinfecting means outlet operatively disposed approximate the opposite end portion of said housing for communicating the purified and disinfected water flowing through said hollow annular space to said dispensing means;

a relatively thin film of plastic material disposed about said lamp for isolating the surface thereof from contact with the water passing through said hollow annular space to prolong the life of the lamp;

a first purified water flow path;

a second drinking water flow path;

said first drinking water flow path including said reverse osmosis filter means, said temporary holding tank, and said afterfilter means;

means for operatively selecting at least one of purified water and drinking water and generating a signal indicative thereof;

means responsive to the deposit of a predetermined value of at least one specie, coin, token, and the like for generating a coin received signal;

means for establishing a first, second, and third vending cycle time whose duration is sufficient to dispense a first, second and third predetermined quantity of processed water, respectively, that first predetermined quantity of water being equal to said predetermined quantity and the sum of said second and third quantities of water being equal to said predetermined quantity;

first valve means operatively disposed in said first path and responsive to said purified water signal for opening to allow supply water to flow through said first path;

second valve means operatively disposed in said second path and responsive to said drinking water signal for opening said second path to conduct supply water to said dispensing means;

means responsive to said drinking water signal for maintaining said second valve means open until the expiration of said second vending cycle time for supplying said second predetermined quantity of drinking water to said container and then switching said second valve means closed while opening said first valve means for supplying purified water to said dispensing means for the duration of said third vending cycle time to dispense said predetermined quantity of drinking water into said container.

* * * * *